United States Patent
Zmarsly et al.

(10) Patent No.: US 9,499,726 B2
(45) Date of Patent: Nov. 22, 2016

(54) PRESSURE-SENSITIVE ADHESIVES BASED ON NATURAL RUBBER AND POLYACRYLATES

(75) Inventors: Franziska Zmarsly, Hamburg (DE); Sabine Thormeier, Hamburg (DE); Christian Kreft, Hamburg (DE); Axel Burmeister, Buchholz (DE); Stephan Bünz, Ostrohe (DE)

(73) Assignee: tesa SE, Norderstedt (DE)

(*) Notice: Subject to any disclaimer, the term of this patent is extended or adjusted under 35 U.S.C. 154(b) by 193 days.

(21) Appl. No.: 13/130,477

(22) PCT Filed: Dec. 7, 2009

(86) PCT No.: PCT/EP2009/066505
§ 371 (c)(1),
(2), (4) Date: Jul. 5, 2011

(87) PCT Pub. No.: WO2010/069800
PCT Pub. Date: Jun. 24, 2010

(65) Prior Publication Data
US 2011/0256395 A1 Oct. 20, 2011

(30) Foreign Application Priority Data
Dec. 17, 2008 (DE) .......................... 10 2008 062 368

(51) Int. Cl.
| C09J 7/02 | (2006.01) |
| C09J 133/08 | (2006.01) |
| C09J 133/10 | (2006.01) |
| C09J 109/00 | (2006.01) |
| C09J 193/00 | (2006.01) |
| C08L 7/00 | (2006.01) |
| C08L 93/00 | (2006.01) |
| C08L 33/08 | (2006.01) |
| C08L 33/10 | (2006.01) |
| C09J 107/00 | (2006.01) |

(52) U.S. Cl.
CPC ............ *C09J 133/08* (2013.01); *C09J 7/0214* (2013.01); *C09J 7/0217* (2013.01); *C09J 107/00* (2013.01); *C09J 193/00* (2013.01); *C08L 7/00* (2013.01); *C08L 33/08* (2013.01); *C08L 33/10* (2013.01); *C08L 93/00* (2013.01); *C08L 2205/03* (2013.01); *C09J 133/10* (2013.01); *C09J 2201/606* (2013.01); *C09J 2407/00* (2013.01); *C09J 2433/00* (2013.01); *Y10T 428/2848* (2015.01); *Y10T 428/2857* (2015.01)

(58) Field of Classification Search
None
See application file for complete search history.

(56) References Cited

U.S. PATENT DOCUMENTS

| 5,504,136 A * | 4/1996 | Davis ..................... C09J 123/16 524/490 |
| 5,539,033 A | 7/1996 | Bredahl et al. |
| 5,550,175 A | 8/1996 | Bredahl et al. |
| 5,789,487 A | 8/1998 | Matyjaszewski et al. |
| 5,804,510 A * | 9/1998 | Spies ......................... C09J 7/04 428/343 |
| 5,854,364 A | 12/1998 | Senninger et al. |
| 5,945,491 A | 8/1999 | Matyjaszewski et al. |
| 6,379,791 B1 * | 4/2002 | Cernohous et al. ...... 428/355 R |
| 6,506,447 B1 * | 1/2003 | Hirsch et al. .............. 427/208.4 |
| 6,511,743 B1 * | 1/2003 | Ko ......................... C09J 7/0246 428/343 |
| 6,630,239 B2 * | 10/2003 | Cernohous et al. ...... 428/355 R |
| 6,759,122 B2 * | 7/2004 | Spies ..................... C09J 7/0214 428/343 |
| 6,765,078 B2 | 7/2004 | Husemann et al. |
| 6,780,271 B1 * | 8/2004 | Burmeister et al. ...... 156/244.11 |
| 7,070,051 B2 * | 7/2006 | Kanner et al. ................ 206/382 |
| 2004/0092685 A1 | 5/2004 | Husemann et al. |
| 2009/0181250 A1 | 7/2009 | Zmarsly et al. |
| 2010/0104864 A1 * | 4/2010 | Zollner et al. ................ 428/354 |
| 2010/0129653 A1 * | 5/2010 | Koike ..................... C09J 7/021 428/355 AC |

FOREIGN PATENT DOCUMENTS

| CA | 698 518 | 11/1967 |
| CA | 2754011 A1 | 10/2010 |

(Continued)

OTHER PUBLICATIONS

D. Satas [Handbook of Pressure Sensitive Adhesive Technology, van Nostrand, New York 1989, pp. 444-514.

(Continued)

*Primary Examiner* — Frank D Ducheneaux
(74) *Attorney, Agent, or Firm* — Norris McLaughlin & Marcus, P.A.

(57) ABSTRACT

A pressure-sensitive adhesive consisting of a homogeneous mixture of at least one natural rubber component and at least one polyacrylate component displays significantly improved properties in cohesion and aging and weathering resistance compared to the individual components. Particularly good properties are achieved when the adhesive contains x % by weight of at least one natural rubber component, y % by weight of at least one polyacrylate component, v % by weight of at least one adhesive resin component and w % by weight of additives, where $10 \leq x \leq 80$, $10 \leq y < 95$, $0 \leq v \leq 50$, $0 \leq w \leq 10$ and $x+y+v+w=100$. A single- or double-sided adhesive tape consisting of at least one support and at least one layer of such a pressure-sensitive adhesive therefore likewise has good cohesion and aging resistance properties.

6 Claims, 2 Drawing Sheets

(56) References Cited

FOREIGN PATENT DOCUMENTS

| | | |
|---|---|---|
| DE | 23 40 040 A1 | 3/1975 |
| DE | 102008004388 A1 | 7/2009 |
| DE | 102009015233 A1 | 10/2010 |
| EP | 0 824 111 A1 | 2/1998 |
| EP | 824 110 A1 | 2/1998 |
| EP | 826 698 A1 | 3/1998 |
| EP | 841 346 A1 | 5/1998 |
| EP | 850 957 A1 | 7/1998 |
| EP | 1 978 069 A1 | 10/2008 |
| GB | 1469682 A * | 4/1977 |
| JP | 7 278 509 | 10/1995 |
| JP | 07 324 182 A2 | 12/1995 |
| JP | 7 331 197 | 12/1995 |
| JP | WO 2006/062179 A1 * | 6/2006 ................ C09J 7/02 |
| WO | 94 11 175 | 5/1994 |
| WO | 95 25 774 | 9/1995 |
| WO | 97 07 963 | 3/1997 |

OTHER PUBLICATIONS

T.G. Fox, Bull. Am. Phys. Soc. 1 (1956) 123.

* cited by examiner

PRESSURE-SENSITIVE ADHESIVES BASED ON NATURAL RUBBER AND POLYACRYLATES

This application is a 371 of PCT/EP2009/066505, filed Dec. 7, 2009 which claims priority benefit under 35 U.S.C. §119 of the German Patent Application No. 10 2008 062 368.7, filed Dec. 17, 2008.

FIELD OF THE INVENTION

The present invention relates to a new pressure-sensitive adhesive, to a method for producing it, and to the use thereof as a self-adhesive tape having improved properties.

BACKGROUND OF THE INVENTION

Pressure-sensitive adhesives (PSAs) have been known for decades. Pressure-sensitive adhesives are adhesives which even under a relatively weak applied pressure permit a durable connection with the substrate and which after use can be detached from the substrate again substantially without residue. Pressure-sensitive adhesives are permanently pressure-sensitively adhesive at room temperature, in other words having a sufficiently low viscosity and a high tack, meaning that they wet the surface of the respective substrate under even low applied pressure. The adhesive bonding capacity of the adhesives derives from their adhesive properties, and their redetachability from their cohesive properties. Different compounds are contemplated as a basis for pressure-sensitive adhesives. Main groups include natural rubbers, synthetic rubbers, and acrylates.

Pressure-sensitive adhesives based on natural rubber have been known for a long time.

Natural rubber possesses very good cohesive properties. However, the poor aging resistance and weathering stability constitutes a problem.

CA 698 518 describes an operation for achieving production of a composition through addition of high plasticizer fractions and/or simultaneously strong mastication of the rubber. Although by this method it is possible to obtain PSAs with extremely high tack force, the relatively high plasticizer fraction or else the severe degradation of the molecular structure of the elastomer to a molecular weight average of $M_w \leq 1$ million means that there are limitations on the achievability of the user-compatible shear strength, even with relatively high crosslinking subsequently.

The use of polymer blends in which not only nonthermoplastic natural rubber but also block copolymers are used, in a ratio of approximately 1:1, is essentially an unsatisfactory compromise solution, producing neither high shear strengths when the self-adhesive tapes are employed at relatively high temperatures, nor significant improvements over the properties described in the patent.

JP 07 324 182 A2 describes a multistage method in which a double-sidedly adhesive tape has a pressure-sensitive adhesive layer based on an acrylic resin adhesive, and a second layer comprising a blend of isoprene-styrene elastomer, natural rubber, and nonreactive hydrocarbon resin (Arkon P 100). This tape serves as a carpet laying tape, which is likewise not subject to any exacting requirements with regard to shear strength at higher temperatures.

The use of nonthermoplastic elastomers is additionally described in JP 95 331 197, in which an isocyanate-reactive natural rubber (polyisoprene grafted with maleic ester) having an average molecular weight of below 1 million with aliphatic, nonreactive hydrocarbon resins is used, which is crosslinked with blocked isocyanates (for example, Desmodur Conn.), the mixture being precrosslinked at 150° C. for five minutes and, following subsequent coating onto PET film, being cured at 180° C. for several minutes (for example, 15 minutes). This procedure makes it clear how complicated it is to achieve postcrosslinking if the natural rubber is subjected to excessive degradation during the production process.

Patent application JP 95 278 509 protects a self-adhesive tape in which the natural rubber is masticated to an average molecular weight of $M_w$=100 000 to 500 000 in order to provide a coatable, homogeneous mixture with hydrocarbon resins, rosin/rosin-derivative resins, and terpene resins, which have good processing properties at between 140° C. and 200° C. and at a coating viscosity of 10 to $50 \times 10^3$ cps, but which require an extremely high subsequent EBC dose (40 Mrad) in order to ensure the shear strength that is necessary for service. For carrier materials such as impregnated and/or sized papers and also fabric carriers based on rayon and the like, the system is poorly functional, since the necessarily high radiation doses entail significant carrier damage.

The use of exclusively nonthermoplastic rubbers as elastomer component in the formulation of pressure-sensitive adhesives, with the existing cost advantage possessed by natural rubbers, for example, over the standard commercial block copolymers, and the outstanding properties, more particularly the shear strength, of the natural rubber and of corresponding synthetic rubbers, is also set out comprehensively in patents WO 94 11 175, WO 95 25 774, WO 97 07 963, and, accordingly, U.S. Pat. No. 5,539,033, U.S. Pat. No. 5,550, 175.

Described in this context are the additions that are customary in PSA technology, such as tackifier resins, plasticizers, and fillers.

The production method disclosed in each case is based on a twin-screw extruder which, with the selected process regime involving mastication of the rubber and subsequent staged addition of the individual additives, with a corresponding temperature regime, allows compounding to take place to form a homogeneous PSA blend. Described comprehensively is the step of masticating the rubber, which precedes the production process itself. This step is necessary for and characteristic of the method selected, since with the technology selected there it is vital for the subsequent incorporation of the further components and for the extrudability of the ready-blended composition. Also described is the infeed of atmospheric oxygen, as recommended by R. Brzoskowski, J. L. and B. Kalvani in Kunststoffe 80 (8), (1990), p. 922 ff., in order to accelerate mastication of the rubber.

This process makes the subsequent step of electron beam crosslinking (EBC) vital, as is the use of reactive substances as EBC promoters in order to achieve an effective crosslinking yield.

Both method steps are described in the stated patents, but the EBC promoters selected also tend toward unwanted chemical crosslinking reactions at elevated temperatures. This limits the use of certain tackifying resins. Pressure-sensitive adhesives based on polyacrylates have also been known for a long time. Polyacrylates possess very good adhesive properties, but polyacrylates are inferior to other compounds in the area of cohesion.

DESCRIPTION OF THE INVENTION

It was an object of the present invention, therefore, to provide a pressure-sensitive adhesive which combines good cohesive properties with good weathering stability and aging resistance.

Surprisingly it has been found that a homogeneous mixture of at least one natural rubber component and at least one polyacrylate component also combines the positive properties of the two substances, i.e., a homogeneous mixture of this kind possesses good cohesive properties, while having aging resistance and weathering stability which are a significant increase on natural rubber.

Homogeneous in the sense of the present invention denotes mesoscopically and macroscopically homogeneous and also directionally independent in terms of the properties; that is, the compounds of the invention are isotropic materials.

The basis for the rubber-based adhesives is advantageously a nonthermoplastic elastomer selected from the group of natural rubbers or of synthetic rubbers, or it is composed of any desired blend of natural rubbers and/or synthetic rubbers, the natural rubber or natural rubbers being selectable in principle from all available grades such as, for example, crepe, RSS, ADS, TSR or CV products, depending on required level of purity and level of viscosity, and the synthetic rubber or synthetic rubbers being selectable from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), and polyurethanes, and/or blends thereof.

With further preference it is possible to select thermoplastic elastomers as a basis for the adhesive. Representatives that may be mentioned at this point include the styrene block copolymers and especially the styrene-isoprene-styrene (SIS) and styrene-butadiene-styrene (SBS) products.

A polyacrylate component in the sense of this invention is any compound which is composed of a polymer whose parent structure has acrylatelike monomers.

The group of the acrylatelike monomers is composed of all compounds having a structure which can be derived from the structure of unsubstituted or substituted acrylic acid or methacrylic acid or else from esters of these compounds which can be described by the general formula $CH_2=C(R^1)(COOR^2)$, where the radical $R^1$ may be a hydrogen atom or a methyl group and the radical $R^2$ may be a hydrogen atom or else is selected from the group of saturated, unbranched or branched, substituted or unsubstituted $C_1$ to $C_{30}$ alkyl groups.

As acrylatelike monomers it is possible in principle to employ all of the group of these compounds that is described above, their specific selection and their proportion being tailored to the respective requirements of the intended area of application.

Thus, for instance, as acrylatelike monomers it is possible inter alia to use those acrylic and methacrylic esters in which the radical $R^2$ is selected from the group of saturated, unbranched or branched, substituted or unsubstituted $C_4$ to $C_{14}$ alkyl groups, more particularly $C_4$ to $C_9$ alkyl groups. Specific examples, without wishing to be restricted by this enumeration, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, as for example isobutyl acrylate, 2-ethylhexyl acrylate, 2-ethylhexyl methacrylate, isooctyl acrylate, isooctyl methacrylate, and also cyclohexyl methacrylate, isobornyl acrylate, isobornyl methacrylate or 3,5-dimethyladamantyl acrylate.

The properties of the polyacrylate component are determined predominantly by the selection of the monomers and by the molecular weight obtained. The most important monomers are n-butyl acrylate, 2-ethylhexyl acrylate, and acrylic acid. Suitable monomer building blocks are described in "Acrylic Adhesives", Donatas Satas in Handbook of Pressure Sensitive Adhesive Technology, Second Edition, edited by Donatas Satas, Van Nostrand Reinhold New York, pages 396 to 456.

Polyacrylate components used comprise more particularly [in each case in % by weight]

0% to 20% acrylic acid units
0% to 100% n-butyl acrylate units
0% to 100% 2-ethylhexyl acrylate units.

One preferred embodiment uses polyacrylate components with 0.5% to 12% by weight acrylic acid units. Another preferred embodiment uses polyacrylate components with 0.5% to 3% by weight acrylic acid units and 99.5% to 90% by weight, more preferably 99.5% to 96% by weight, n-butyl acrylate units. A further example of polyacrylate components of the invention are polyacrylate components with 80% to 90% by weight 2-ethylhexyl acrylate units and 8% to 20% by weight n-butyl acrylate units.

The polyacrylate components may further comprise other monomer units, by means of which it is possible to exert control over, for example, the glass transition temperature and the crosslinkability. Examples are methyl acrylate, ethyl acrylate, methylethyl acrylate, maleic anhydride, acrylamide, glycidyl methacrylate, isopropyl acrylate, n-propyl acrylate, isobutyl acrylate, n-octyl acrylate, and also the corresponding methacrylates of these acrylates. The polyacrylate components comprise typically 0% to 10% by weight of these additional monomer units; either exclusively one additional monomer unit or mixtures thereof are used.

The glass transition temperature obtained is dependent on the monomers employed. In the dried state, the polyacrylate components used for the adhesives of the invention have glass transition temperatures in particular of between −80° C. and −15° C., preferably between −75° C. and −25° C., and more preferably between −55° C. and −35° C.

The solids content of the polyacrylate components is situated in particular at between 30% and 70% by weight, preferably between 45% and 60% by weight. By way of example, mention may be made of the polyacrylate components Primal PS 83d, Primal PS 90 from Rohm & Haas.

If desired, the polyacrylate component may comprise further additions. Suitable crosslinking agents may be epoxy resins, amine derivatives such as, for example, hexamethoxymethylmelamine and/or condensation products of an amine, for example, melamine, urea with an aldehyde, for example, formaldehyde. In order to obtain nonadhesive polyacrylate components, it has been found favorable to add further substances optionally, which react, for example, with the carboxyl groups of the polymer. Examples thereof are aziridines, such as ethyleneimine, propyleneimine.

One advantageous onward development uses a polyacrylate component
which is obtainable by a radical polymerization,
which is based to an extent of at least 65% by weight on at least one acrylic monomer from the group of the compounds of the following general formula:

where $R_1$ is H or $CH_3$ and the radical $R_2$ is H or $CH_3$ or is selected from the group of branched or unbranched, saturated alkyl groups having 2 to 20, preferably having 4 to 9, carbon atoms, where the average molecular weight of the polyacrylate component is at least 650 000, and which, if it is applied to a carrier, possesses a preferential direction, the refractive index measured in preferential direction, $n_{MD}$, being greater than the refractive index measured in a direction perpendicular to the preferential direction, $n_{CD}$, and where the difference $\Delta n = n_{MD} - n_{CD}$ is at least $1 \times 10^{-5}$.

Nonexclusive examples of alkyl groups which may find preferential application for the radical $R_2$ include the following: butyl, pentyl, hexyl, heptyl, octyl, isooctyl, 2-methylheptyl, 2-ethylhexyl, nonyl, decyl, dodecyl, lauryl, or stearyl (meth)acrylate or (meth)acrylic acid.

Additionally advantageous is a polyacrylate component which is based to an extent of up to 35% by weight on comonomers in the form of vinyl compounds, more particularly on one or more vinyl compounds selected from the following group:

vinyl esters, vinyl halides, vinylidene halides, nitriles of ethyenically unsaturated hydrocarbons.

In the sense of the invention, acrylic compounds with functional groups are also embraced by the term "vinyl compound". Vinyl compounds of this kind comprising functional groups are maleic anhydride, styrene, styrenic compounds, vinyl acetate, (meth)acrylamides, N-substituted (meth)acrylamides, β-acryloyloxypropionic acid, vinylacetic acid, fumaric acid, crotonic acid, aconitic acid, dimethylacrylic acid, trichloroacrylic acid, itaconic acid, vinyl acetate, hydroxyalkyl (meth)acrylate, amino-group-containing (meth)acrylates, hydroxyl-group-containing (meth)acrylates, more preferably 2-hydroxyethyl (meth)acrylate, 2-hydroxypropyl (meth)acrylate and/or 4-hydroxybutyl (meth)acrylate, and photoinitiators with double-bond functionalization; the above enumeration is only by way of example, and not conclusive.

For the polyacrylate components it is particularly advantageous if the composition of the corresponding monomers is selected such that the resultant adhesives possess pressure-sensitive adhesive properties in accordance with D. Satas [Handbook of Pressure Sensitive Adhesive Technology, 1989, VAN NOSTRAND REINHOLD, New York]. For this purpose the glass transition temperature of the polyacrylate component ought for example to be below 25° C.

The polyacrylate components employed for the invention are prepared preferably by a radically initiated polymerization.

The free radical polymerization may be carried out in the presence of an organic solvent or in the presence of water or in mixtures of organic solvents and water or in bulk. It is preferred to use as little solvent as possible. The polymerization time amounts—depending on conversion and temperature—to between six and 48 h.

In the solution polymerization, solvents used are preferably esters of saturated carboxylic acids (such as ethyl acetate), aliphatic hydrocarbons (such as n-hexane or n-heptane), ketones (such as acetone or methyl ethyl ketone), special-boiling-point spirit, or mixtures of these solvents. For the polymerization in aqueous media or in mixtures of organic and aqueous solvents, the emulsifiers and stabilizers that are known to the skilled person for this purpose are added to the polymerization. Polymerization initiators used are customary radical-forming compounds such as peroxides, azo compounds, and peroxosulfates, for example. Initiator mixtures, too, can be used. In the polymerization it is possible to use further regulators for molecular weight lowering and reduction of the polydispersity. As so-called polymerization regulators it is possible to use alcohols and ethers, for example. The molecular weight of the acrylate PSAs is advantageously between 650 000 and 2 000 000 g/mol, more preferably between 700 000 and 1 000 000 g/mol.

In a further procedure, the polymerization is carried out in polymerization reactors which in general are provided with a stirrer, two or more feed vessels, reflux condenser, heating, and cooling, and are equipped for operation under $N_2$ atmosphere and superatmospheric pressure.

After the polymerization in solvent, the polymerization medium may be removed under reduced pressure, this operation being carried out at elevated temperatures, in the range from 80 to 150° C., for example.

In another preferred embodiment, a polyacrylate copolymer (referred to below simply as "polyacrylate") based on acrylic esters and/or methacrylic esters is employed as polyacrylate component, with at least some of the acrylic esters and/or methacrylic esters containing primary hydroxyl groups. The fraction of the acrylic and/or methacrylic esters containing primary hydroxyl groups is, in a preferred procedure, up to 25% by weight, based on the polyacrylate without organic fillers. It may additionally be of advantage if the polyacrylate in part contains copolymerized acrylic acid.

Use is made more particularly, preferably, of a polyacrylate which can be traced back to the following reactant mixture, comprising monomers of the following composition:

a1) acrylic esters and/or methacrylic esters of the following formula $CH_2=C(R^I)(COOR^{II})$ where $R^I$=H or $CH_3$ and $R^{II}$ is an alkyl chain having 1 to 20 C atoms, with a fraction of 65%-99% by weight, a2) acrylates and/or methacrylates whose alcohol component comprises at least one primary hydroxyl group, and/or vinyl compounds which are copolymerizable with acrylates and which comprise at least one primary hydroxyl group, with a fraction of 1% to 20% by weight, a3) and, if the fractions of a1) and a2) do not add up to 100% by weight, olefinically unsaturated monomers having functional groups, with a fraction of 0% to 15% by weight.

The monomers are preferably selected such that the resulting polymers can be used at room temperature as PSAs, more particularly such that the resulting polymers possess pressure-sensitive adhesive properties in accordance with the "Handbook of Pressure Sensitive Adhesive Technology", by Donatas Satas (van Nostrand, New York 1989, pages 444-514).

The monomers are preferably selected such that the resulting polymers have a glass transition temperature of $T_g \leq 25°$ C., in the sense of a dynamic glass transition temperature for amorphous systems and of the melting temperature for semicrystalline systems, which may be determined by dynamic mechanical analysis (DMA) at low frequencies.

In order to obtain a polymer glass transition temperature $T_g$ which is preferred for PSAs, of $T_g \leq 25°$ C., in accordance with what has been said above, the monomers are very preferably selected such, and the quantitative composition of the monomer mixture advantageously chosen such, that, in accordance with an equation (E1) in analogy to the Fox equation (cf. T. G. Fox, Bull. Am. Phys. Soc. 1 (1956) 123), the desired $T_g$ value for the polymer is produced.

$$\frac{1}{T_g} = \sum_n \frac{w_n}{T_{g,n}} \quad (E1)$$

In this equation, n represents the serial number of the monomers used, $w_n$ the mass fraction of the respective monomer n (% by weight), and $T_{g,n}$ the respective glass transition temperature of the homopolymer of the respective monomer n in K.

With particular preference, for a1), acrylic or methacrylic monomers are used which are composed of acrylic and methacrylic esters having alkyl groups of 1 to 20 C atoms and comprise preferably 4 to 9 C atoms. Specific examples, without wishing to be restricted by this enumeration, are methacrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and the branched isomers thereof, such as, for example, isobutyl acrylate, 2-ethylhexyl acrylate, 2-ethylhexyl methacrylate, isooctyl acrylate, isooctyl methacrylate. Further classes of compound which can be used for a1) are monofunctional acrylates and/or methacrylates of bridged cycloalkyl alcohols, composed of at least 6 C atoms. The cycloalkyl alcohols may also be substituted, as for example by C-1-6 alkyl groups, halogen atoms or cyano groups. Specific examples are cyclohexyl methacrylates, isobornyl acrylate, isobornyl methacrylates, and 3,5-dimethyladamantyl acrylate.

One very preferred procedure uses, for a2), monomers which contain hydroxyl groups, very preferably primary hydroxyl groups. Examples of a2) are hydroxyethyl acrylate, hydroxyethyl methacrylate, hydroxypropyl acrylate, hydroxypropyl methacrylate, 6-hydroxyhexyl methacrylate, 4-hydroxystyrene, and allyl alcohol, this enumeration not being conclusive.

Monomers for a3) are, for example, olefinically unsaturated monomers having functional groups such as carboxylic acid groups, acid anhydride groups, phosphonic acid groups, amide or imide or amino groups, isocyanate groups, epoxy groups or thiol groups.

Specific examples for a3) are acrylic acid or methacrylic acid, maleic anhydride, itaconic anhydride, itaconic acid, glyceridyl methacrylate, glyceryl methacrylate, vinylacetic acid, β-acryloyloxypropionic acid, trichloroacrylic acid, fumaric acid, crotonic acid, aconitic acid, acrylonitrile, dimethylacrylic acid, N,N-dialkyl-substituted amides, such as, for example, N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl)methacrylamide, N-methylolacrylamide, N-(ethoxymethyl)acrylamide, N-isopropylacrylamide, this enumeration not being conclusive.

Particularly suitable are the polyacrylates when they are prepared by bulk, solution or emulsion polymerization and are optionally concentrated subsequently, particularly if they contain volatile constituents.

In one preferred procedure, the polyacrylates have a weight-average molecular weight $M_w$ of at least 300 000 g/mol up to a maximum of 1 500 000 g/mol. The average molecular weight is determined by size exclusion chromatography (GPC) or matrix-assisted laser desorption/ionization-mass spectrometry (MALDI-MS). The polyacrylates comprise at least one comonomer which contains one or more primary hydroxyl groups. It may be necessary to carry out the polymerization in the presence of polymerization regulators such as thiols, halogen compounds, and more particularly alcohols (isopropanol), in order to set the desired weight-average molecular weight $M_w$.

Also suitable particularly are polyacrylates which have a narrow molecular weight distribution (polydispersity<4). These compositions, at relatively low molecular weight, are particularly shear-resistant after crosslinking. Since, in comparison to a polyacrylate with a normal distribution, the molecular weight necessary in the case of a narrow-distribution polyacrylate is lower for a given level of cohesion, there are reductions in viscosity and in operating temperatures. Accordingly, a polyacrylate with a narrow distribution allows a particularly long processing life.

Polyacrylates with a narrow distribution can be prepared by anionic polymerization or by controlled radical polymerization methods, the latter being especially suitable. Examples are described in U.S. Pat. No. 6,765,078 B2 and DE 10036901 A1 or US 2004/0092685 A1. As well, Atom Transfer Radical Polymerization (ATRP) can be used advantageously for the synthesis of polyacrylates with a narrow distribution, in which case, as an initiator, it is preferred to use monofunctional or difunctional secondary or tertiary halides and, for the abstraction of the halide or halides, complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are described further in specifications U.S. Pat. No. 5,945,491 A, U.S. Pat. No. 5,854,364 A, and U.S. Pat. No. 5,789,487 A.

Optionally it may be of advantage to subject the thermally crosslinked layer to radiation-postcrosslinking. Particularly suitable for this purpose is electron beam crosslinking.

For the adhesives of the invention it may be very advantageous if they are in resin-free form. Optionally, for the control and setting of particular adhesive-related properties, and as phase mediators, it is additionally possible to admix the compounded formulation with resins. As tackifying resins for addition, use may be made, without exception, of all tackifying resins which are already known and are described in the literature. Representatives that may be stated include the pinene resins, indene resins, and rosins, their disproportionated, hydrogenated, polymerized, and esterified derivatives and salts, the aliphatic and aromatic hydrocarbon resins, terpene resins and terpene-phenolic resins, and also $C_5$, $C_9$, and other hydrocarbon resins. Any desired combinations of these and further resins may be used in order to adjust the properties of the resultant adhesive in accordance with requirements. With particular advantage it is possible to use all resins which are compatible (soluble) with the polyacrylate in question; reference may be made in particular to all aliphatic, aromatic, alkylaromatic hydrocarbon resins, hydrocarbon resins based on pure monomers, hydrogenated hydrocarbon resins, functional hydrocarbon resins, and natural resins. A preferred terpene-phenolic resin is, for example, Dertophene T 110, a preferred hydrogenated rosin derivative Foral 85.

Any desired combinations of these and further resins may be used in order to adjust the properties of the resultant adhesive in accordance with requirements. Generally speaking, it is possible to use all resins which are compatible (soluble) with the polymer in question. Express reference may be made to the depiction of the state of knowledge in the "Handbook of Pressure Sensitive Adhesive Technology" by Donatas Satas (van Nostrand, 1989).

Besides the natural rubber component, the polyacrylate component, and the tackifying resin component, the adhesive of the invention may also have further adjuvants such as, for example, plasticizers (plasticizing agents, e.g., low molecular mass polyacrylates, phthalates, water-soluble plasticizers, plasticizing resins, phosphates or polyphosphates), crosslinkers, fillers (e.g. fibers, carbon black, zinc oxide, titanium dioxide, chalk, solid or hollow glass beads, microspheres made of other materials, silica, silicates), nucleators, expandants, pigments, rheological additives, adhesion promoter additives, elastomers, compounding agents, aging inhibitors, in the form of primary and secondary antioxidants or in the form of light stabilizers, for example, UV absorbers, and also other auxiliaries and adjuvants, examples being driers (for instance, molecular sieve zeolites, or calcium oxide), flow control and leveling agents, and/or wetting agents such as surfactants, or catalysts.

With great preference it is possible to use various forms of chalk as a further filler, in which case particular preference is given to using Mikrosohl chalk (from Söhlde). At preferred fractions of up to 30% by weight, there is no decisive change in the adhesive-related properties (instantaneous bond strength to steel) from the addition of filler, and in some cases they even lead, surprisingly, to improvements (shear strength at room temperature).

Furthermore, low-flammability fillers, such as, for example, ammonium polyphosphate, and also electrically conductive fillers, such as, for example, conductive carbon black, carbon fibers and/or silver-coated beads, additionally ferromagnetic additives, such as iron(III) oxides, for example, additionally additives for producing foamed layers, such as, for example, expandants, solid glass beads, hollow glass beads, expandable microballoons, aging inhibitors, light stabilizers, ozone protectants, may be added or compounded in before or after the concentration of the polyacrylate.

The adhesive of the invention advantageously comprises
x % by weight of at least one natural rubber component,
y % by weight of at least one polyacrylate component,
v % by weight of at least one tackifying resin component, and
w % by weight of additives,
where
$10 \leq x \leq 80$,
$10 \leq y < 90$,
$0 \leq v \leq 50$,
$0 \leq w \leq 10$, and
$x+y+v+w=100$.

Compounds of this kind exhibit good cohesion in conjunction with good aging resistance and weathering stability.

The adhesive of the invention comprises with particular preference between 10% and 60% by weight, preferably between 20% and 50% by weight, of the natural rubber component, and between 40% and 90% by weight, preferably between 50% and 80% by weight, of the polyacrylate component. In addition it is possible to add tackifying resin components and further additives, but particular preference is given to compounds which contain no further components other than natural rubber component and polyacrylate component. In the case of compounds of this kind, an optimum is reached with regard to the improvement in aging behavior in comparison to rubber compositions, and to the improvement in the cohesion relative to acrylates.

The pressure-sensitive adhesives of the invention are prepared by a method which comprises the following steps:
(a) providing the natural rubber component, the polyacrylate component, and optionally the tackifying resin component and also the additives; and
(b) mixing the components provided in step (a) in an extruder, to give a homogeneous mixture.

A suitable extruder employed is, for example, a planetary roller extruder or a twin-screw extruder. Preference is given to an extruder temperature of more than 130° C., more preferably 130° C., and an extruder speed in mixing and/or conveying operation of more than 50 revolutions/min, more preferably 75 to 100 revolutions/min. It is appropriate to select a temperature profile which, for the processing of the components provided under step (a), is suitable for optimally fulfilling the mixing of the components as stated under step (b), and for effectively removing the water present in the weakly ammoniacal acrylate copolymer dispersion.

The temperature profile is preferably such that the natural rubber is homogeneously mixed in the first mixing zone optionally with a portion of the resin at mixing temperatures of 120-190° C. At the beginning of the second mixing zone, the acrylate, in the form of a dispersion, is added, and the temperature of the mixture reduces to 120-140° C. as a result of the cooling effect of the water evaporating. The gaseous water is withdrawn by suitable assemblies, such as a vacuum dome, for example. At the end of the extruder, a dry adhesive with a temperature of 130° C. is taken off. As a result of the mixing of the components in a suitable mixing assembly, as for example a planetary roller extruder (step b), it is possible to produce mixtures (referred to below as "blends") of polyacrylates and natural rubber homogeneously in almost any proportions. These blends can then be shaped to a pressure-sensitively adhesive layer in a further step, by means of a roll applicator mechanism. For that purpose, the mixture is applied appropriately with layer thicknesses of 15 to 200 g/m$^2$, preferably 50 g/m$^2$, to a carrier, preferably paper or a film.

The mixture is preferably subjected to an electron beam cure (EBC), resulting in crosslinking. This step of the method is appropriately carried out subsequent to the shaping of the mixture.

Typical irradiation equipment which may be employed includes linear cathode systems, scanner systems, and segmented cathode systems, where electron beam accelerators are concerned. A comprehensive description of the state of the art, and the most important process parameters, are found in Skelhorne, Electron Beam Processing, in Chemistry and Technology of UV and EB formulation for Coatings, Inks and Paints, Vol. 1, 1991, SITA, London. The typical acceleration voltages are situated in the range between 50 kV and 500 kV, preferably 80 kV and 300 kV. The scatter doses employed range between 5 to 150 kGy, more particularly between 20 and 100 kGy.

The electron beam cure brings about crosslinking of the pressure-sensitive adhesive of the invention. Accordingly, a marked improvement in the temperature stability of the pressure-sensitive adhesive of the invention is achieved, as short-term temperature stability tests have shown. This is tested by means of the Shear Adhesion Failure Temperature test (for short: SAFT/tesa test method (dent. No. JOPMA 0013).

The invention relates, finally, to the use of the above-described adhesives for a single- or double-sided adhesive tape composed of at least one carrier and a layer of a pressure-sensitive adhesive.

Carrier materials used for the pressure-sensitive adhesive of the invention, for adhesive tapes, for example, are the materials that are customary and familiar to the skilled person, such as films (polyester, PET, PE, PP, BOPP, PVC, polyimide, cellulose acetate), nonwovens, foams, wovens and woven-fabric films, and also release paper (glassine, HDPE, LDPE). In a further embodiment, masking tapes are produced with the pressure-sensitive adhesive. This enumeration is not conclusive.

The invention is elucidated more comprehensively below by reference to examples. The results are illustrated in the diagrams appended.

Test Methods

Peel Strength (bond strength BS)

The peel strength (bond strength) is tested as described below:

A strip of the (self-)adhesive tape under investigation is bonded in a defined width (standard: 20 mm) to a polished steel plate or to another desired adhesion/test substrate such as, for example, polyethylene, polycarbonate or glass, and so on, by tenfold overrolling with a 5 kg steel roller. Double-sided adhesive tapes are given a reinforcement backing in the form of an unplasticized PVC film 36 μm thick. The plate prepared in this way is clamped into the testing apparatus, the adhesive strip is peeled via its free end at a peel angle of 180° and at a speed of 300 mm/min on a tensile testing machine, and the force required to accomplish this is recorded. It is also possible for the plates prepared in this way to be subjected to measurement only after a storage time beforehand, such as, for example, after 14 days at room temperature or after 7 days under UV irradiation. The measurement results are reported in N/cm and are averaged over three to five measurements. The measurements are carried out as standard in an acclimatized room at 23° C. and 50% relative humidity or under possible application conditions, such as, for example, at 5° C. in a climatic chamber provided for this purpose.

Quantitative Determination of the Shear Strength: Static Shear Test (SST)

An adhesive tape is applied to a defined, rigid substrate (in this case steel) and subjected to a constant shearing load. The holding time in minutes is ascertained. A suitable plate suspension system (angle 179±1°) ensures that the adhesive tape does not peel away from the bottom edge of the plate.

The test is intended primarily to supply information on the cohesiveness of the composition. This is only the case, however, when the weight and temperature parameters are selected such that cohesive failure does in fact occur during the test. Moreover, the test provides information on the adhesion to the substrate or on a combination of adhesion and cohesiveness of the composition.

A strip, 13 mm wide, of the adhesive tape under test is bonded to a polished steel plaque (test substrate) over a length of 5 cm by tenfold overrolling with a 2 kg roller. Double-sided adhesive tapes are lined on the reverse with a 50 μm aluminum foil and hence reinforced. Subsequently a belt loop is mounted to the bottom end of the adhesive tape. A nut and bolt is then used to fasten an adaptor plaque to the facing side of the shear test plate, in order to ensure the specified angle of 179±1°. The time for development of strength, between roller application and loading, is to be between 10 and 15 minutes. The weights are subsequently attached gently by means of the belt loop. An automatic clock counter then determines the point in time at which the test specimens shear off.

Short-term Temperature Stability (SAFT)

SAFT (Shear Adhesion Failure Temperature) is an accelerated test for the short-term temperature stability of adhesive tapes, with increasing temperature.

An adhesive tape, cut to a width of 10 mm and with a reinforcement 5 mm wide on the reverse face, is adhered to a heatable steel plate and is overrolled back and forth using a 2 kg steel roller at a speed of 10 m/min 3×. The test strip thus bonded, and the reinforcement, are cut to the same length at the top edge, to allow the gauge to record the shear path in μm during measurement. The prepared sample is loaded in shear with a specified 50 g weight. During the test, shear path in μm and temperature in ° C. are recorded. Beginning at 30° C., and at a rate of 9° C./min, the bond area is heated to 200° C. Measurement is ended when the specified end temperature, 200° C., has been reached, or when a slip path of 1000 μm has been reached.

Raw Materials List

The following raw materials were used in the examples described below:

TABLE 1

| Raw materials list | | |
| --- | --- | --- |
| Tradename | Raw material/IUPAC | Manufacturer/supplier |
| Rubber SVR 3L | Natural rubber (NR) | Kautschukgesellschaft mbH |
| Primal PS 83.D | Polyacrylate (Ac) | Rohm & Haas |
| Piccotac 1100-E | Aliphatic hydrocarbon resin | Eastman Chemical Middelburg B.V. |
| Dertophene T 110 | Terpene-phenolic resin | DRT (Willers & Engel) |

Formulas

The adhesive systems below were prepared by the method described, and elucidated further, and evaluated by means of the test methods stated, in the examples below:

TABLE 2

Formulas used

| Formula | NR [% by weight] | Ac [% by weight] | Piccotac 1100-E [% by weight] | Dertophene T 110 [% by weight] |
|---|---|---|---|---|
| A | 0 | 100 | | |
| B | 19 | 81 | | |
| C | 33 | 67 | | |
| D | 46 | 54 | | |
| E | 57 | 43 | | |
| F | 67 | 33 | | |
| G | 75 | 25 | | |
| H | 50 | | 50 | |
| I | 23 | 47 | | 29 |
| J | 42 | 32 | | 26 |
| K | 58 | 19 | | 24 |
| L | 70 | 9 | | 22 |
| M | 20 | 80 | | |
| N | 50 | 50 | | |

The self-adhesive compositions produced in accordance with the formulas given above were each coated with a coat weight of 50 g/m² onto a 23 μm PET carrier (Kemafoil HPH100, Coverne).

EXAMPLE 1

The self-adhesive compositions according to formulas A to G were compounded by the method described, shaped to a web, and then coated at 50 g/m² in each case onto the stated 23 μm PET carrier.

On the specimens produced, determinations were made in each case of the bond strength to steel after instantaneous measurement, in other words without storage, and, additionally, after crosslinking by electron beam cure (EBC) at a dose of 160 kV and 50 kGy.

TABLE 3

Evaluation of Example 1

| Formula | Bond strength to steel | |
|---|---|---|
| | instantaneous [N/cm] | after EBC [N/cm] |
| A | 5.0 | 2.1 |
| B | 4.1 | 1.8 |
| C | 4.0 | 1.7 |
| D | 3.7 | 1.6 |
| E | 2.9 | 1.4 |
| F | 2.5 | 1.2 |
| G | 1.9 | 0.7 |

Figure 1:
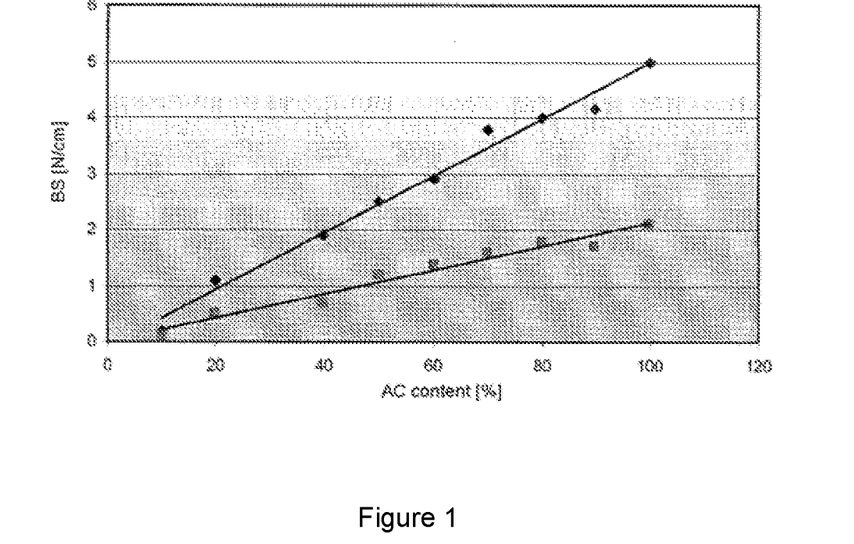
FIG. 1 shows: the bond strength falls from 5.0 N/cm in the noncrosslinked state to 2.2 N/cm after EBC crosslinking.

Polyacrylates exhibit in their bond strength a marked dependency on the EBC crosslinking. In the example (diagram 1), the bond strength falls from 5.0 N/cm in the noncrosslinked state to 2.1 N/cm after EBC crosslinking. In comparison, rubber-based compositions show virtually no reaction to crosslinking. These tendencies are then also apparent in mixtures: the higher the proportion of acrylate, the greater the difference in bond strength, and vice versa—as the amount of rubber goes up, there is a decrease in the dependency of the bond strength on the EBC. With fractions of natural rubber, accordingly, the strong influence on the polyacrylates by the EBC can be controlled.

EXAMPLE 2

A standard composition based on natural rubber without antioxidants (formula H) was prepared by the method described, shaped to a web, and coated with a coat weight of 50 g/m² onto a PET film 23 μm thick, and was subsequently compared with selected specimens from Example 1 in terms of bond strength after different storage conditions.

Table 4 sets out the bonding strengths found and compares then with those of formulas A, B, D and G, in other words as a function of acrylate content.

TABLE 4

Evaluation of Example 2

| Formula | Bond strength to steel | | |
|---|---|---|---|
| | RT, instantaneous [N/cm] | 5° C. [N/cm] | after 14 d RT [N/cm] |
| A | 5.0 | 4.1 | 8.8 |
| B | 4.1 | 3.3 | 4 |
| D | 3.7 | 3 | 2.3 |
| G | 1.9 | 2.1 | 0.8 |
| H | 3.5 | 1.8 | 3.8 |

Figure 2:
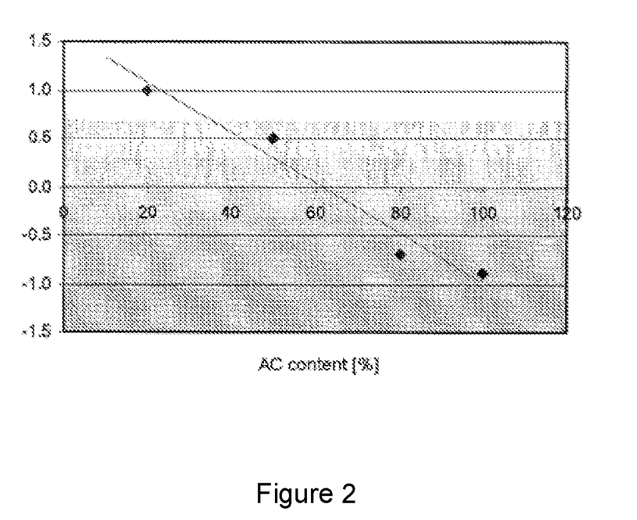
FIG. 2 shows: further adhesive-related results are set out for NR/Ac blends with 81%, 54%, and 25% acrylate content, in comparison to straight acrylate and to a composition based on natural rubber.

In Table 4 and also in diagram 2, further adhesive-related results are set out for NR/Ac blends with 81%, 54%, and 25% acrylate content, in comparison to straight acrylate and to a composition based on natural rubber. Corresponding BS tests are shown at room temperature (23° C.) and 5° C. and also after 14-day application to steel. The low-temperature specimens are both adhered at 5° C. (and overall according to instructions) and also measured.

It is possible to show that with defined mixing proportions, even without the admixing of resin, it is possible to achieve bond strengths of the kind that are entirely customary for example, in the area of the applications of masking tapes. The straight acrylate loses bond strength at low temperatures and still shows a massive increase by 3.8 N/cm after 14-day application at room temperature. For acrylates, however, this is entirely customary, and in comparison therewith is not observed to such a degree with natural rubber compositions. Natural rubber compositions as well lose low-temperature bond strength on application, on account of their relatively high Tg of around 0° C. In contrast, within the area under consideration, the mixtures of natural rubber and acrylate exhibit very balanced bond strengths, which fluctuate only by about a difference of 0.5 N/cm.

EXAMPLE 3

TABLE 5

Evaluation of Example 3

| Formula | Bond strength to glass | | |
|---|---|---|---|
| | RT, instantaneous [N/cm] | after 1 wk, UV [N/cm] | Δ bond strength |
| H | 6.3 | 4.3 | 2.0 |
| G | 0.4 | 1.8 | −1.4 |
| F | 0.8 | 2.0 | −1.2 |
| C | 1.3 | 2.4 | −1.1 |
| A | 1.4 | 2.5 | −1.1 |

Figure 3:
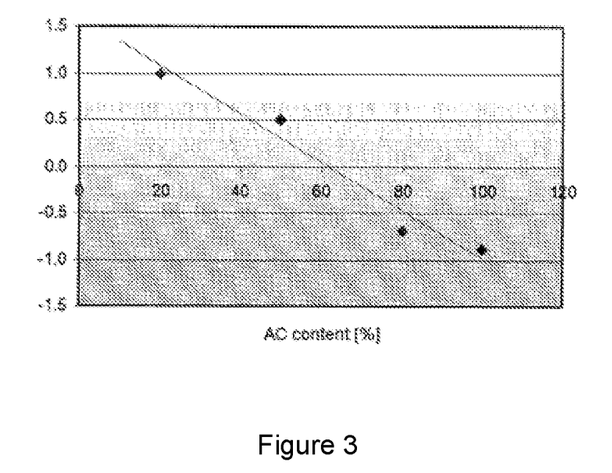
FIG. 3 shows: a loss in bond strength after storage for one week under a sunlight lamp

The aging resistance and weathering stability of the blends of the invention may likewise be seen as a significant, new property feature. If a standard natural rubber adhesive (formula H) without antioxidant is employed in comparison, it exhibits a loss in bond strength which is customary for rubber adhesives, after storage for one week under a sunlight lamp (cf. Table 5 and diagram 3).

Here, only tendencies and not absolute values of the bond strength ought to be considered. The blends are not resin-blended and PVC-crosslinked, and therefore exhibit much lower bond strength than the natural rubber adhesive.

The inventive blends of natural rubber and polyacrylates here exhibit the tendency of the acrylates toward peel increase. All of the blends investigated increase by more than 1 N/cm in their bond strengths. Also interesting is the fact that, in comparison to the straight acrylate, amounts of about 20% of rubber in the compounded formulation apparently have no effect on bond strength and aging. Only at and above amounts of around 50% natural rubber are there changes in adhesive properties and aging properties.

EXAMPLE 4

TABLE 6

Evaluation of Example 4

| Formula | SST RT [min] | SST RT after EBC [min] |
|---|---|---|
| A | 10 | |
| B | 20 | |
| C | 15 | |
| D | 15 | |
| E | 10 | |
| F | 15 | |
| G | 10 | |
| I | 40 | 360 |
| J | 60 | 450 |
| K | 240 | 650 |
| L | 170 | 4100 |

Figure 4:
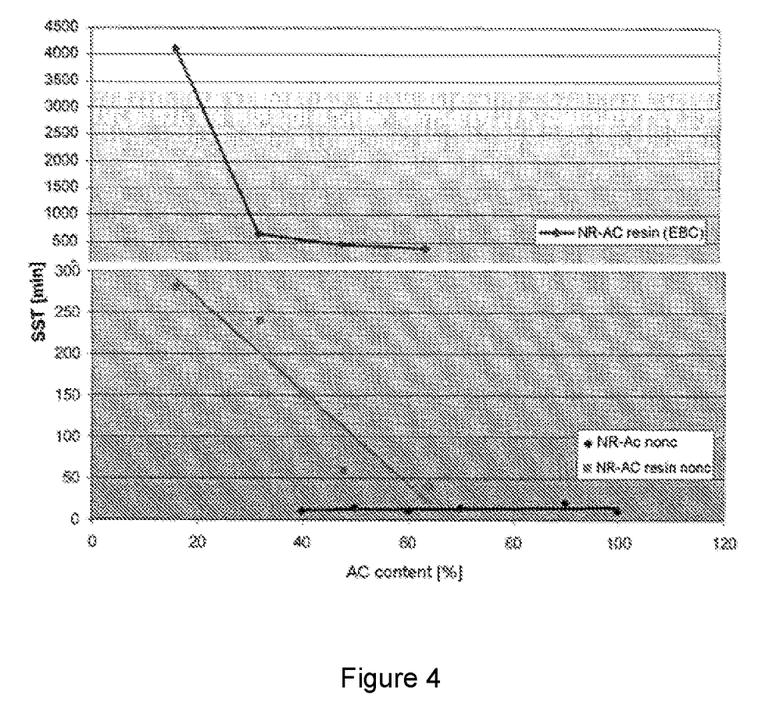
FIG. 4 shows: the higher the natural rubber content of the blend, the higher the corresponding SST as well.

By means of DSC it is possible to show that macroscopically or visually homogeneous NR/Ac blends also have two separate glass transition points. Microscopically, therefore, the system present is a two-phase system. This two-phasedness presumably also explains the lower shear stability time or SST of noncrosslinked NR/Ac compounded formulations. These times can be improved by EBC crosslinking, where there is already a distinct dependency apparent on the NR/Ac ratio (cf. Table 6 and diagram 4). The higher the natural rubber content of the blend, the higher the corresponding SST as well. This tendency is apparent even more markedly in the case of resin-blended blends, when a resin is selected which is equally suitable for both polymer systems. The solution of the resin in natural rubber and acrylate can then also be monitored in the DSC. The resin appears here to act as a "solubilizer" between the two phases. This is reflected, ultimately, in the massively increased shear stability times. Here again, a distinct dependency on the NR content can be found.

EXAMPLE 5

For masking applications (in the outdoor sector), in particular, the bonding strength level of a product over relatively large temperature ranges and after relatively long times (peel increase) is of interest.

It is possible to show that, for NR/Ac blends, an optimum can be found which exhibits improved aging behavior as compared with rubber adhesives and improved cohesive properties as compared with acrylates. This optimum obtains particularly for mixtures of 80%-50% polyacrylate and 20%-50% natural rubber; see Table 7.

TABLE 7

Evaluation of Example 5

| | Bond strength to steel | | |
|---|---|---|---|
| Formula | RT, instantaneous [N/cm] | 5° C. [N/cm] | after 14 d RT [N/cm] |
| M | 4.0 | 3.3 | 4.0 |
| N | 2.5 | 3.0 | 2.3 |

The invention claimed is:

1. A pressure-sensitive adhesive consisting of a homogeneous mixture of between 20 to 50 wt. % of at least one natural rubber component and between 50 to 80 wt. % of one polyacrylate component, wherein the one polyacrylate component is a polymer consisting of a monomer selected from the group consisting of methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, isobutyl acrylate, 2-ethylhexyl acrylate, 2-ethylhexyl methacrylate, isooctyl acrylate, isooctyl methacrylate, cyclohexyl methacrylate, isobornyl acrylate, isobornyl methacrylate, 3,5-dimethyladamantyl acrylate, and mixtures thereof, and contains no further components other than said natural rubber component and said polvacrylate component.

2. A method for producing a pressure-sensitive adhesive of claim 1, comprising the steps of:
   a) providing the natural rubber and the acrylate polymer and
   b) mixing the components provided in step a) in an extruder to give a homogeneous mixture, and
   wherein the method is carried out at a temperature of more than 100° C., and at an extruder speed of more than 50 rpm.

3. The method of claim 2, wherein
   c) the mixture obtained in step b) is shaped to a pressure-sensitively adhesive layer by application with a layer thickness of 15 to 200 g/m².

4. The method of claim 2, wherein the mixture, subsequently to step c), is subjected to an electron beam cure.

5. A single- or double-sided adhesive tape composed of at least one carrier and at least one layer of the pressure-sensitive adhesive of claim 1.

6. A single- or double-sided adhesive tape comprising at least one carrier and at least one layer of the pressure-sensitive adhesive produced by a method as claimed in claim 2.

* * * * *